(12) United States Patent
Fang et al.

(10) Patent No.: US 12,550,009 B2
(45) Date of Patent: Feb. 10, 2026

(54) ENHANCED HANDOVER FOR MOVING Wi-Fi MULTI-LINK DEVICES

(71) Applicant: Intel Corporation, Santa Clara, CA (US)

(72) Inventors: Juan Fang, Portland, OR (US); Necati Canpolat, Beaverton, OR (US); Laurent Cariou, Milizac (FR); Dave Cavalcanti, Portland, OR (US); Dibakar Das, Hillsboro, OR (US); Po-Kai Huang, San Jose, CA (US); Minyoung Park, San Ramon, CA (US); Ganesh Venkatesan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 800 days.

(21) Appl. No.: 17/711,703

(22) Filed: Apr. 1, 2022

(65) Prior Publication Data
US 2023/0147311 A1    May 11, 2023

(51) Int. Cl.
*H04W 36/00* (2009.01)
*H04W 12/041* (2021.01)
*H04W 84/12* (2009.01)

(52) U.S. Cl.
CPC ..... *H04W 36/0016* (2013.01); *H04W 12/041* (2021.01); *H04W 36/0038* (2013.01); *H04W 84/12* (2013.01)

(58) Field of Classification Search
CPC ......... H04W 36/0016; H04W 36/0036; H04W 12/041; H04W 84/12
See application file for complete search history.

(56) References Cited

U.S. PATENT DOCUMENTS

| | | | |
|---|---|---|---|
| 2021/0368322 A1* | 11/2021 | Seok | H04W 12/041 |
| 2023/0049552 A1* | 2/2023 | Chitrakar | H04W 12/106 |

* cited by examiner

*Primary Examiner* — Jianye Wu
(74) *Attorney, Agent, or Firm* — Gray Ice Higdon, PLLC

(57) ABSTRACT

This disclosure describes systems, methods, and devices related to multi-link devices (MLDs). A MLD may identify a first security key received from a first access point MLD (A-MLD); identify a second security key received from the first A-MLD; transmit, from a first physical location, a first packet to the first A-MLD, the first packet including the first security key; identify a first subset of N packets, the first subset received from the first A-MLD; transmit, from a second physical location, a second packet to the second A-MLD, the second packet including the second security key; identify a second subset of the N packets, the second subset received from the second A-MLD; determine that a third packet of the N packets was not received; and transmit, to the first A-MLD or the second A-MLD, an indication that the third packet was not received.

20 Claims, 13 Drawing Sheets

ENHANCED HANDOVER FOR MOVING Wi-Fi MULTI-LINK DEVICES

TECHNICAL FIELD

This disclosure generally relates to systems and methods for wireless communications and, more particularly, to enhanced handover for Wi-Fi multi-link devices.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1A:
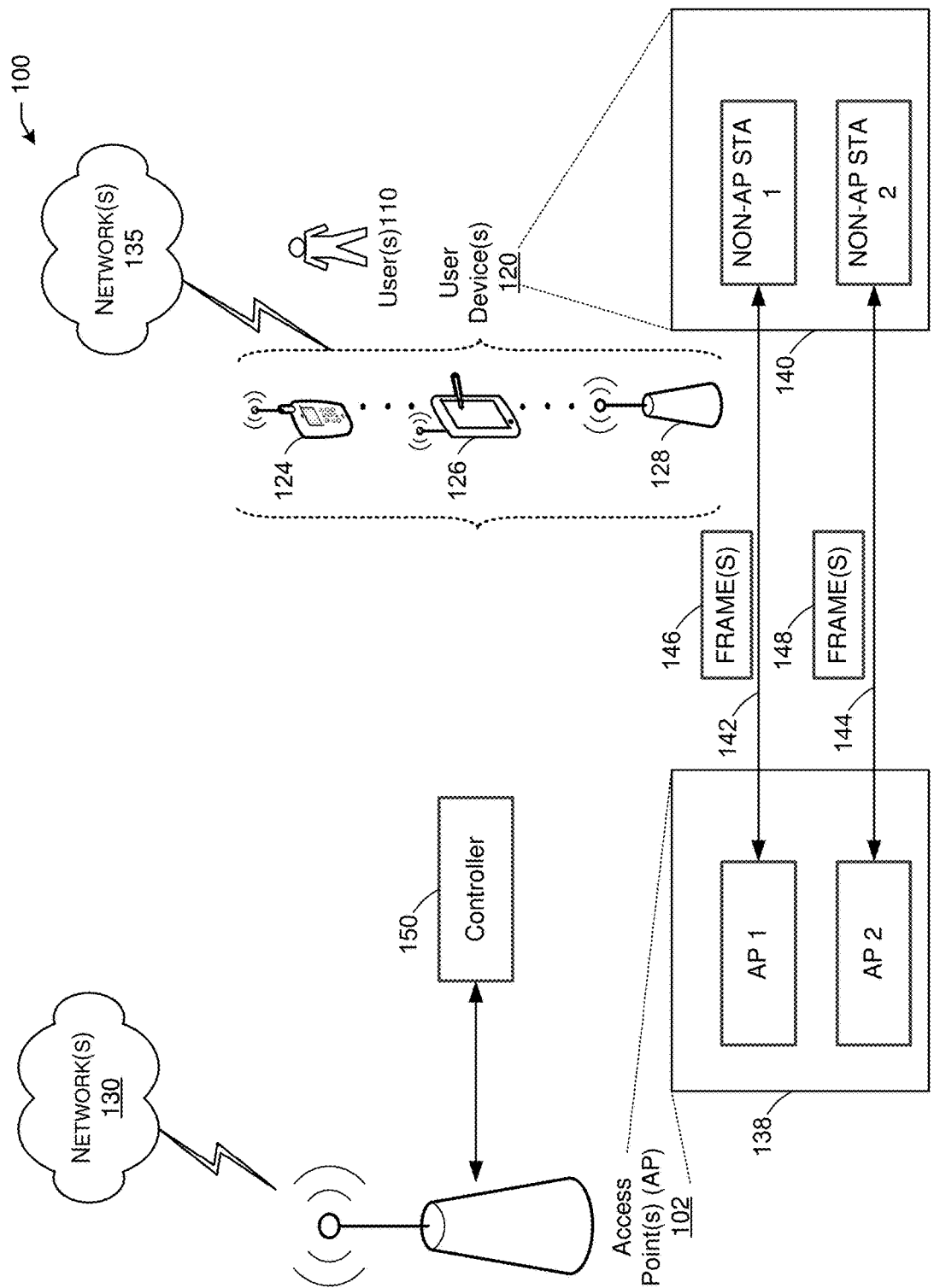
FIG. 1A is a network diagram illustrating an example network environment of multi-link devices (MLDs), in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

The IEEE 802.11 technical standards define wireless communications, including the way that Wi-Fi devices access wireless communication channels. For example, the IEEE 802.11 technical standards provide techniques for multi-link devices (MLDs). Time-sensitive networking (TSN) and real-time applications (RTA) provide with moving MLDs provide new challenges.

A station (STA) may refer to a logical entity that is a singly addressable instance of a medium access control (MAC) and physical layer (PHY) interface to the wireless medium (WM). A communication link (or just "link") in the context of an IEEE 802.11 medium access control (MAC) entity, may refer to a physical path consisting of exactly one traversal of the wireless medium (WM) that is usable to transfer MAC service data units (MSDUs) between two STAs.

In multi-link communications, a multi-link device (MLD), also referred to as a multi-link logical entity (MLLE), may refer to a device that has more than one affiliated STA and that has a medium access control (MAC) layer (e.g., of a communication layer stack) service access point (SAP) to a logical link control (LLC), which may include a MAC data service. An AP MLD (A MLD) may refer to an AP device, where each STA affiliated with the STA MLD is an AP. A non-AP ML device (non-AP MLD) maybe an A MLD, where each STA affiliated with the MLD is a non-AP STA. A MLD may be considered a logical/virtual entity with multiple STAs (e.g., AP STAs or non-AP STAs), and each STA concurrently may use separate communication links with corresponding STAs of another MLD. In this manner, a MLD may communicate over multiple communication links concurrently without having to drop one communication link to allow for establishing another communication link.

Multi-link operation (MLO) is an important 802.11be feature, which allow a device to communicate to another device using multiple links on different channels/bands. A device supporting multiple links is a MLD.

One challenge for next-generation Wi-Fi technology is to support Time-Sensitive Networking (TSN) and Real-Time applications (RTA), which require high reliability with low bounded latency and jitter. The challenges are due to the stochastic nature of a wireless channel, and when the end device is moving in the environment. Defining better support for TSN and RTA application are part of the scope of the next generation Wi-Fi being developed by the 802.11be task group.

Multi-band operation, as one of the most important improvements of 802.11be over 802.11ax, is defined with a general framework that captures all the use cases (e.g., STA seamless and lossless transition between links/bands, STA operation on multiple links/bands with different traffic identifiers on different links/bands, STA operation on multiple links/bands with aggregation for the same traffic identifier) for multi-band operation, whether the STA is a single radio device or a multi-radio device, whether the APs have the same or different medium access control addresses, are collocated or non-collocated (i.e., include APs/Links in different physical devices/locations). The framework makes use of the following concepts: (1) A Multi-link AP Set, which is a set of APs which may or may not be collocated, share a virtual, single medium access control (MAC) service access point (SAP). (2) A client device, which contains a set of collocated STAs. (3) The multi-link association between a client and the multi-link AP set can be performed through single link association by sharing a pairwise transient key (PTK) among multi-links. Where, for an AP in the Multi-link AP set, each configuration of BSS info and the corresponding non-AP STA info of the client device is viewed as a link. (4) The block acknowledgement (BA) agreement is defined as per MLD based, in other words, the MAC layer frame reordering is performed in upper MLD MAC layer.

Some techniques may leverage non-collocated MLDs/APs to support STA mobility. A client device, which contains a set of collocated STAs, can be associated with multiple APs, which are collocated or non-collocated, through single link association with sharing a PTK among multi-links. As a result, the client is able to achieve "zero handover" through simple link switching among multi-links if the MLD is non-collocated. For example, a client device with three STAs may be associated with AP1.1-AP1.3 of an A-MLD in one physical location, and with AP2.1-AP2.3 of another A-MLD in another physical location at the same time through single link association with a shared PTK. While the client is at location A, close to the AP1.1-AP1.3, the client can enable active transmission with AP1.1-AP1.3 while setting the connection with AP2.1-AP2.3 to be sleep mode. While the client is at location B, at the cell edge of both AP1.1.-AP1.3 and AP2.1-AP2.3, the client will be active on one or two of the links with AP1.1-AP1.3 and with AP 2.1-AP2.3. As a result, before the client device's connections are fully switched from AP1.1-AP1.3 to AP2.1-AP2.3, the client may have an active connection with both AP1.1-AP1.3 and AP2.1-AP2.3, and as a result may be able to achieve seamless connection with the multi-AP set without any packet loss during this link switching procedure. For example, packet loss may occur when a controller sends a packet to a multi-link set that is no longer in range of a MLD, so the multi-link set may not be able to forward the packet to the MLD.

In some techniques, a non-collocated MLD framework with a centralized BA agreement per MLD at the MAC SAP, implemented as a centralized multi-AP controller, enables packet transmission or retransmission over any active available link in different physical locations, which can avoid packet loss or delay due to the packet forwarding from the source A-MLD to new A-MLD while the client is moving from near the source A-MLD to near the new A-MLD. However, packet reordering needs to be processed in another physical device such as a multi-AP controller, which is challenging to achieve in real implementation. In addition, single PTK or other security key sharing among multiple links in different locations is also vulnerable.

There is therefore a need to mitigate the shared PTK and BA agreement problems with Wi-Fi MLDs while maintaining the "zero handover" capability for STA mobility.

The present disclosure may use the following definitions. A non-collocated A-MLD may refer to a distributed implementation of an A-MLD consisting of groups of APs at different physical locations. Non-collocated multiple APs may refer to APs that are part of a non-collocated A-MLD and may be in different physical devices/locations. Collocated APs may refer to APs that are part of a MLD and are all in the same physical devices/location. The 902.11be standard defines MLDs, but does not differentiate between collocated and non-collocated MLDs in this manner.

In one or more embodiments, to maintain zero handover for STA mobility while mitigating PTK sharing issues, MLDs may use different PTKs or other security keys for non-collocated multiple APs instead of sharing a single PTK or other security key among non-collocated multiple APs. The multiple PTKs/security keys may be generated one of multiple ways: (1) A central MLD controller may generate different security keys and send the information with related group identifiers to each group of collocated APs (e.g., periodically). For a single client associated to two groups of collocated APs in two different physical locations, the client may have two independent security keys with the two groups of collocated multiple APs (e.g., a security key for one group of collocated multiple APs, and a security key for the other group of collocated multiple APs). The updating of security keys for each group of collocated APs may be performed using a single communication link even if the link is not part of the group of collocated APs to which the security key update is provided (e.g., as long as the link is an AP/link that is from the A-MLD and to which the MLD is associated). (2) Each group of collocated APs may generate security keys independently. The group of APs that is not within the STA's current range may generate the security keys with the STA through the group of APs that is within the STA's current range (e.g., using a backhaul communication with the central MLD controller, which may provide the keys to the group of APs that are within the STA's range, which may forward the keys to the STA).

In one or more embodiments, using different PTKs and other security keys for non-collocated multiple APs, while the client is associated to a single AP, the client may have the security context (e.g., security keys) with other APs that may or may not be within range. As a result, once the STA moves into range of an AP, the current security context may be disabled temporarily, and the STA may start exchanging data with other APs using the pre-saved security context generated through the backhaul via the central MLD controller. The APs may be responsible for the data delivery to the STA. The security keys may need to be generated and updated periodically with multiple APs in different location by using a control plane MLD-level signaling over the backhaul/over-the-air.

In one or more embodiments, to maintain zero handover for STA mobility while mitigating block acknowledgement (BA) issues, the BA agreement may be per non-collocated MLD, but the packet reordering may be performed among a collocated multi-link set. The BA agreement may be performed at the MLD level (e.g., for all APs, collocated and non-collocated), but the expectation may be that packet reordering may be performed among collocated multi-links, and the MLD may enable only the links that are collocated. When transitioning from one multi-link set to another (e.g., while physically moving), the MLD may disable links to collocated multi-links from a first group and enable links from both the first group and a second multi-link group. To enable packet reordering in each collocated multi-link while maintaining the BA agreement per non-collocated MLD, a sequence number (SN) range may need to be defined for each collocated multi-link group, and scoreboard sharing may need to be enabled among two groups of multi-link sets, especially during a transition phase. For example, during a transition phase, the central MLD controller may distribute duplicate packets with SN 1-63 to both a first multi-link set and a second multi-link set, with instructions that packets having SN 1-31 are to be transmitted to the MLD using the first multi-link set, and instructions that packets having SN 32-63 are to be transmitted to the MLD using the second multi-link set. When packets with SN 1-31 cannot be transmitted successfully using the first multi-link set, the MLD client may trigger or request the second multi-link set to transmit the packets, and may deactivate the connection with the first multi-link set.

In one or more embodiments, the BA agreement may be per collocated multi-link set in a non-collocated MLD. This modification of the MLD BA may reduce implementation complexity for a non-collocated MLD, and the reordering may be processed in each collocated multi-link set. The non-collocated MLD controller may perform intelligent traffic splitting and steering to avoid packet loss or delay by forwarding data frames from a source multi-link set to another multi-link set (e.g., the first multi-link set may provide frames to the controller, which may provide the packets to the second multi-link set). The A-MLD may predict the MLD's transition from one multi-link set to another, and may switch the MLD to a particular link based on the MLD's mobility pattern, signal strength, etc. The MLD may inform the A-MLD prior to making a switch so that data delivery is not undermined. The central controller may distribute data redundantly to both a source multi-link set and a target multi-link set, and may predict an upcoming multi-link set switch by the MLD by leveraging the 802.1cb layer protocol or by scheduling in the upper MAC layer.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1A is a network diagram illustrating an example network environment 100 of MLDs, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 4:
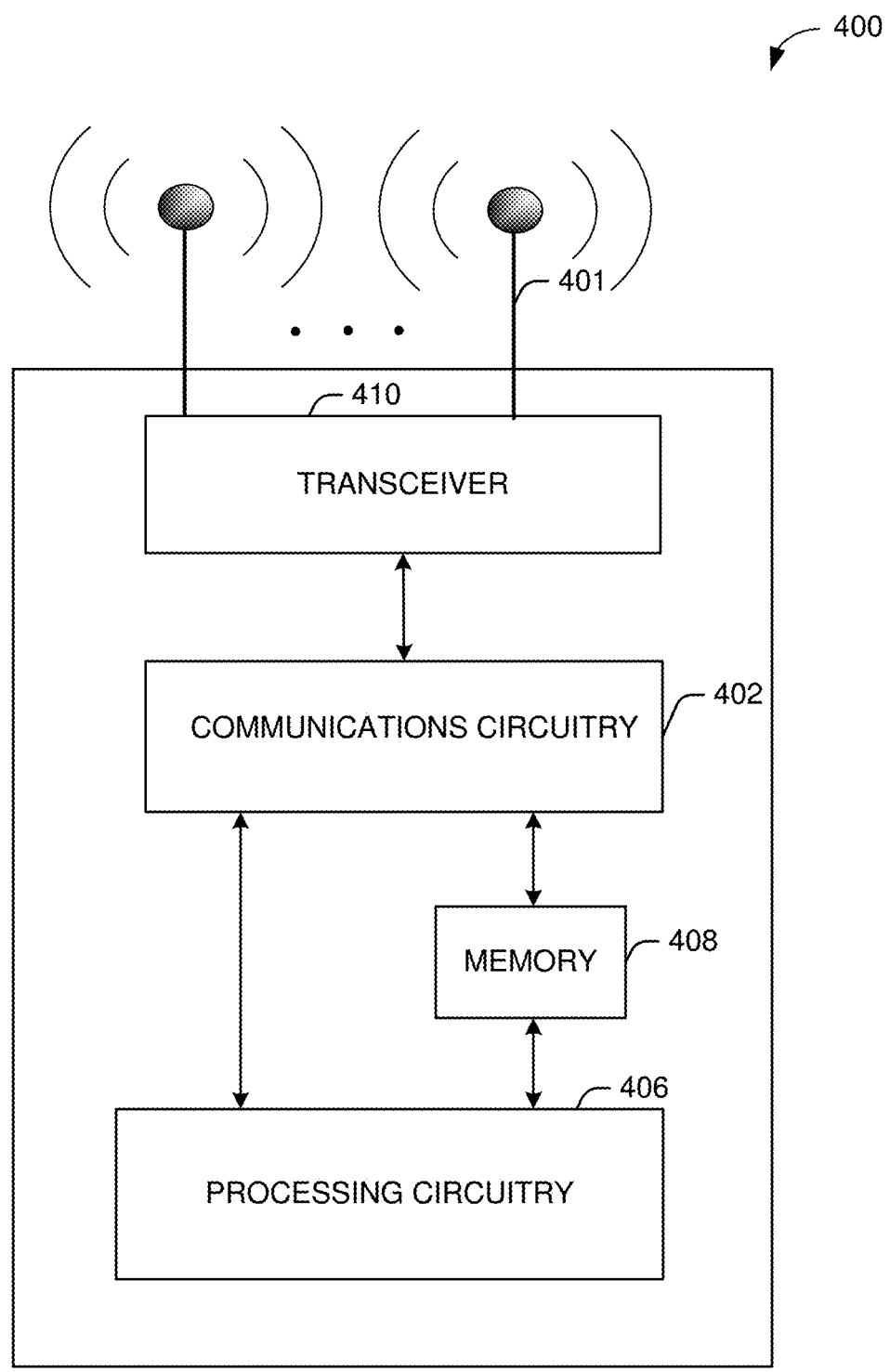
FIG. 4 illustrates a functional diagram of an exemplary communication station that may be suitable for use as a user device, in accordance with one or more example embodiments of the present disclosure.
Figure 5:
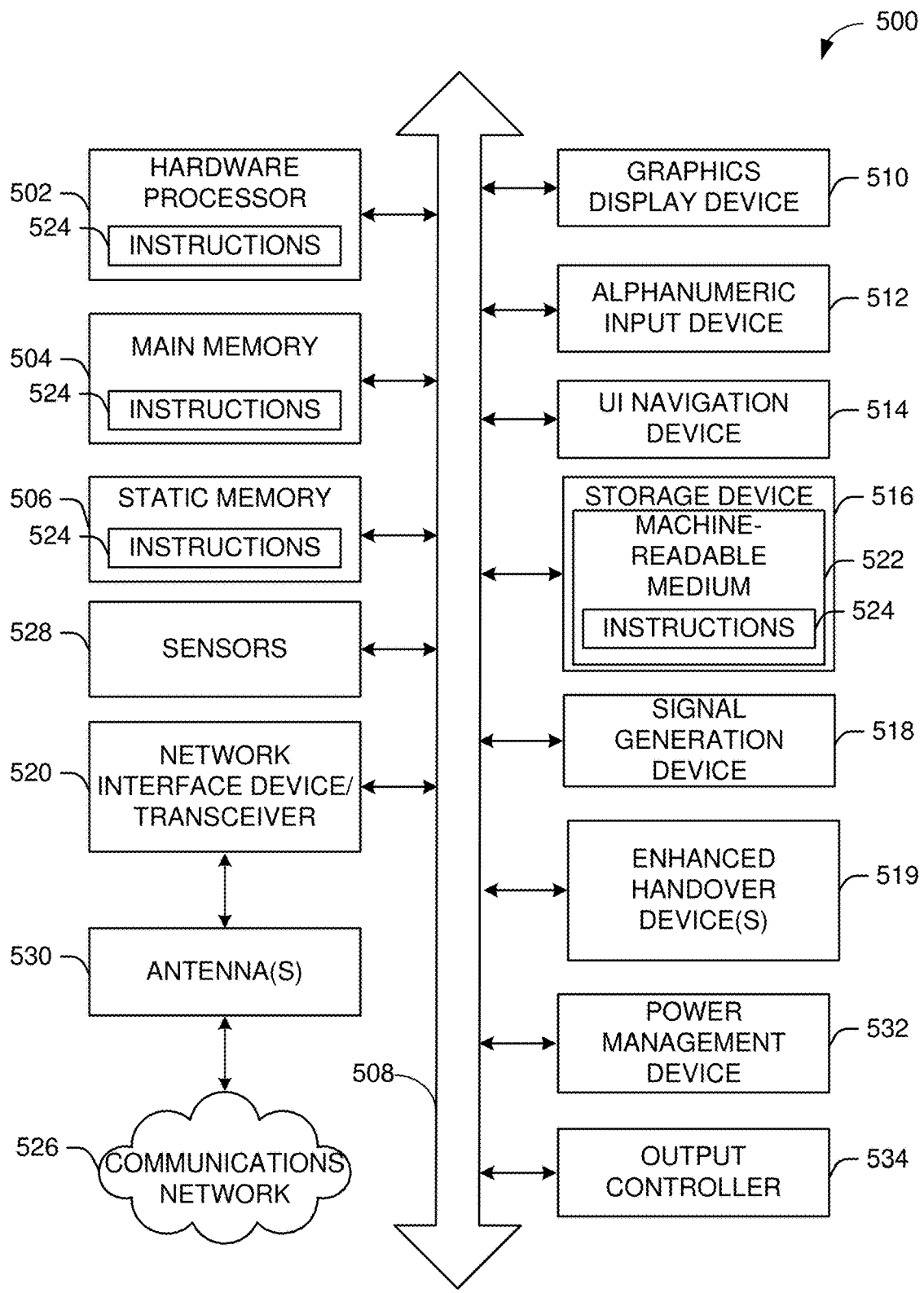
FIG. 5 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 4 and/or the example machine/system of FIG. 5.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile Internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one or more embodiments, and with reference to FIG. 1, AP 102 may be considered an A MLD 138 logical/virtual entity with multiple AP STAs (e.g., AP 1 and AP 2), and a user device of the user devices 120 may be considered a MLD 140 logical/virtual entity with multiple non-AP STAs (e.g., non-AP STA 1 and non-AP STA 2). A first link 142 may be established between the AP 1 and the non-AP STA 1, and a second link 144 may be established between the AP 2 and the non-AP STA 2. Both the first link 142 and the second link 144 may be used simultaneously (e.g., the AP 102 and/or the user device 120 do not need to drop one of the links to use the other link). One or more frames 146 may be sent across the first link 142, and one or more frames 148 may be sent across the second link 144.

Figure 2A:
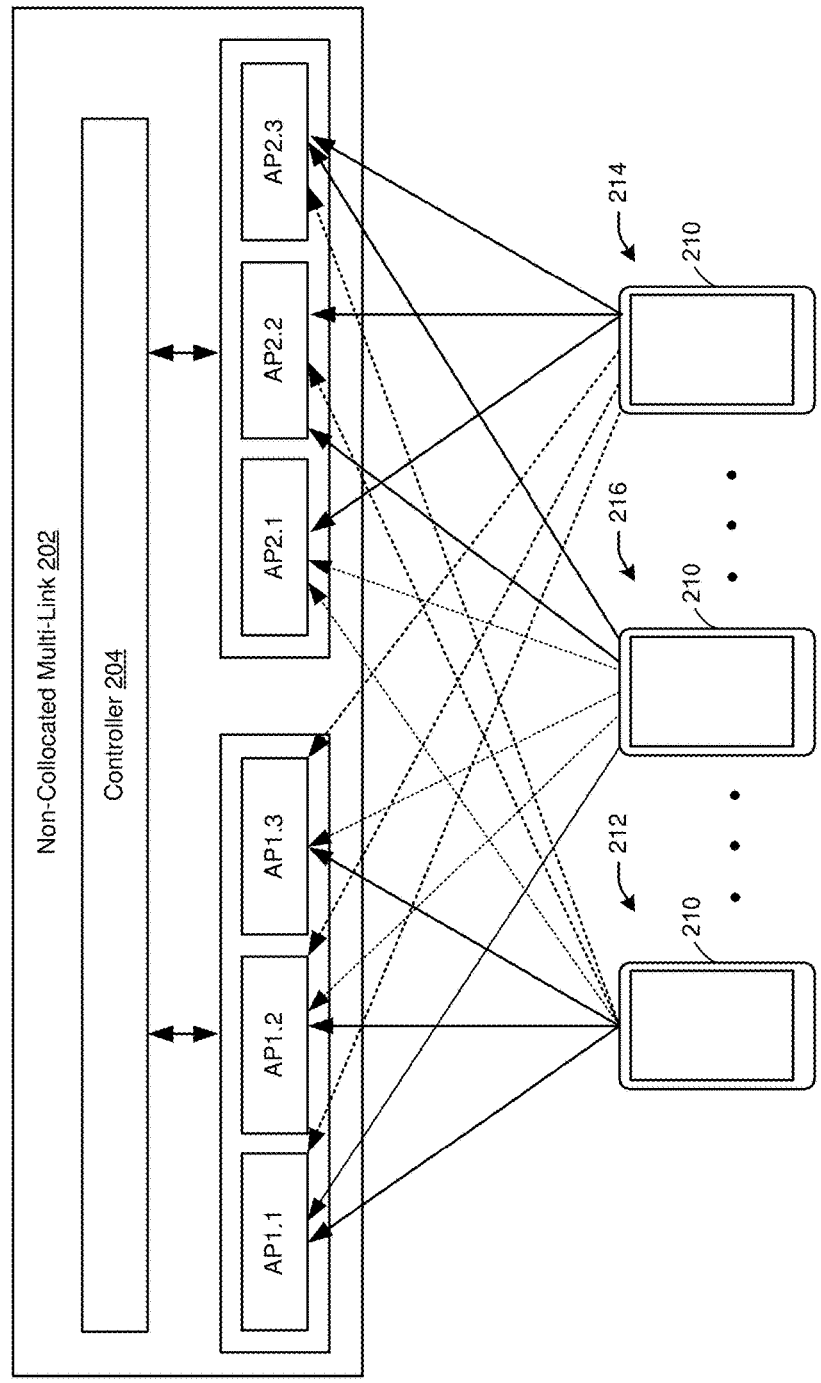
FIG. 2A illustrates a schematic diagram of a non-collocated MLD, in accordance with one or more example embodiments of the present disclosure.
Figure 2B:
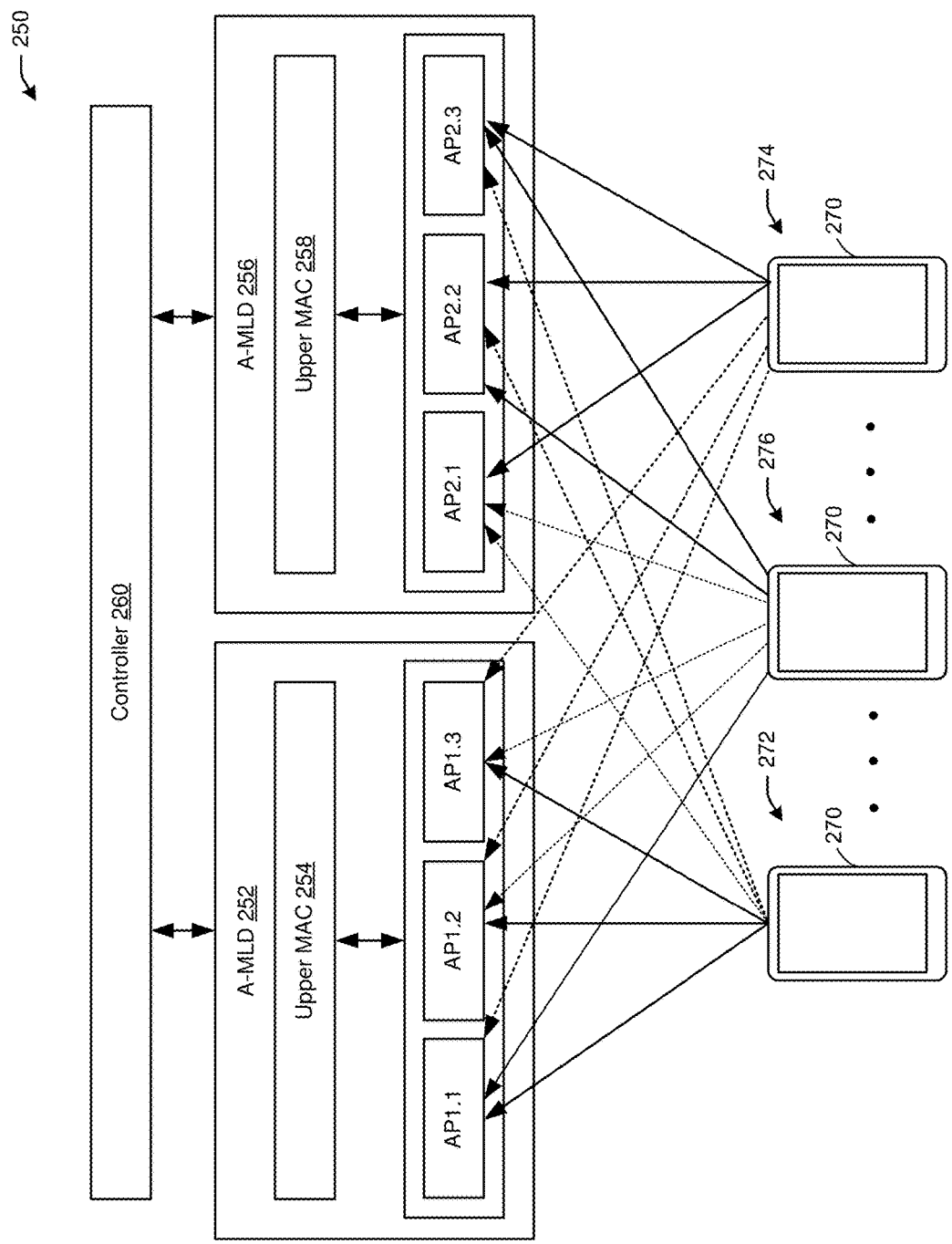
FIG. 2B illustrates a schematic diagram of a non-collocated MLD, in accordance with one or more example embodiments of the present disclosure.

In one or more embodiments, to provide a non-collocated MLD environment, the AP(s) 102 may represent multiple multi-link sets (e.g., as shown in FIGS. 2A and 2B), with the multi-link sets being in communication with a controller 150. The frames 146 and the frames 148 may include MAC-layer packets with sequence numbers, block acknowledgements indicating when a packet was received or not, and/or security keys as discussed further herein.

Figure 1B:
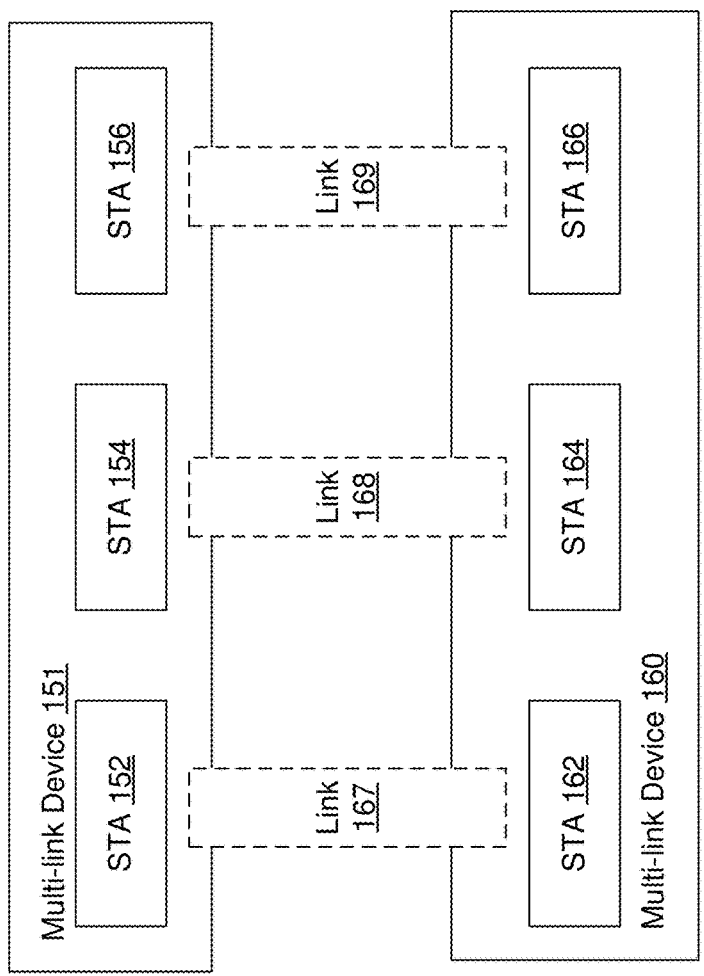
FIG. 1B depicts an illustrative schematic diagram for MLD communications between two logical entities, in accordance with one or more example embodiments of the present disclosure.

FIG. 1B depicts an illustrative schematic diagram for MLD communications between two logical entities, in accordance with one or more example embodiments of the present disclosure.

Referring to FIG. 1B, there are shown two MLDs in communication with each other. MLD 151 may include multiple STAs (e.g., STA 152, STA 154, STA 156, etc.), and MLD 160 may include multiple STAs (e.g., STA 162, STA 164, STA 166, etc.). The STAs of the MLD 151 and the STAs of the MLD 160 may set up links with each other (e.g., link 167 for a first frequency band used by the STA 152 and the STA 162, link 168 for a second frequency band used by the STA 154 and the STA 164, link 169 for a second frequency band used by the STA 156 and the STA 166). In this example of FIG. 1B, the two MLDs may be two separate physical devices, where each one comprises a number of virtual or logical devices (e.g., the STAs).

Figure 1C:
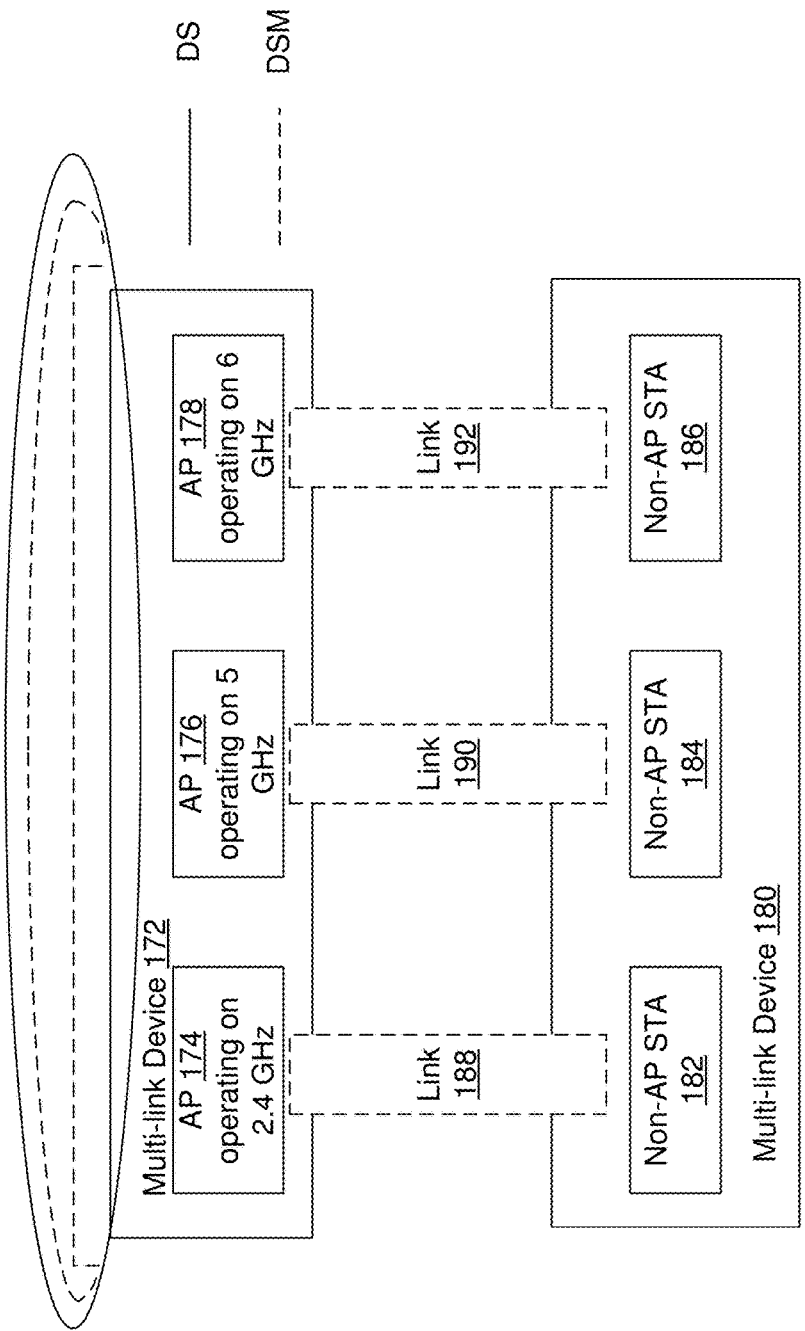
FIG. 1C depicts an illustrative schematic diagram for MLD communications between an access point (AP) MLD with logical entities and a non-AP MLD with logical entities, in accordance with one or more example embodiments of the present disclosure.

FIG. 1C depicts an illustrative schematic diagram for MLD communications between an AP MLD with logical entities and a non-AP MLD with logical entities, in accordance with one or more example embodiments of the present disclosure.

Referring to FIG. 1C, there are shown two MLDs on either side, each which includes multiple STAs that can set up links with each other. For infrastructure framework, MLD 172 may be an A-MLD with logical APs (e.g., AP 174, AP 176, and AP 178) on one side, and MLD 180 may be a non-AP MLD including non-AP logical entities (non-AP STA 182, non-AP STA 184, and non-AP STA 186) on the other side. The detailed definition is shown below. It should be noted that the term MLLE and MLD are interchangeable and indicate the same type of entity. Throughout this disclosure, MLLE may be used but anywhere the MLLE term is used, it can be replaced with MLD. Multi-link non-AP logical entity (non-AP MLLE, also can be referred to as non-AP MLD): A multi-link logical entity, where each STA within the multi-link logical entity is a non-AP EHT STA. It should be noted that this framework is a natural extension from the one link operation between two STAs, which are AP and non-AP STA under the infrastructure framework (e.g., when an AP is used as a medium for communication between STAs).

In the example of FIG. 1C, the MLD 172 and the MLD 180 may be two separate physical devices, where each one comprises a number of virtual or logical devices. For example, the multi-link AP logical entity may comprise three APs, AP 174 operating on 2.4 GHz (e.g., link 188), AP 176 operating on 5 GHz (e.g., link 190), and AP 178 operating on 6 GHz (e.g., link 192). Further, the multi-link non-AP logical entity may comprise three non-AP STAs, non-AP STA 182 communicating with AP 174 on link 188, non-AP STA 184 communicating with AP 176 on link 190, and non-AP STA 186 communicating with AP 178 on link 192.

The MLD 172 is shown in FIG. 1C to have access to a distribution system (DS), which is a system used to interconnect a set of BSSs to create an extended service set (ESS). The MLD 172 is also shown in FIG. 1C to have access a distribution system medium (DSM), which is the medium used by a DS for BSS interconnections. Simply put, DS and DSM allow the AP to communicate with different BSSs.

It should be understood that although the example shows three logical entities within the MLD 172 and the three logical entities within the MLD 180, this is merely for illustration purposes and that other numbers of logical entities with each of the MLDs may be envisioned.

FIG. 2A illustrates a schematic diagram 200 of a non-collocated MLD, in accordance with one or more example embodiments of the present disclosure.

Referring to FIG. 2A, a non-collated multi-link 202 may include a controller 204 in communication with multiple multi-link sets of APs (e.g., a first-multi link set of AP1.1, AP1.2, and AP1.3, and a second multi-link set of AP 2.1, AP2.2, and AP 2.3). A MLD 210 (e.g., a non-AP MLD) may have multiple STAs (e.g., the non-AP STA 182, the non-AP STA 184, and the non-AP STA 186 of FIG. 1C), and may associated to AP1.1-AP1.3 at a first physical location 212. The MLD 210 may be associated to AP2.1-AP2.3 at a second physical location 214, even simultaneously, using a single link association with a shared PTK. When the MLD 210 is at the first physical location 212 (e.g., closer to the AP1.1-AP1.3), the MLD 210 may enable active transmissions with the AP1.1-AP1.3 while setting the connection with the AP2.1-AP2.3 to be in a sleep mode. When the MLD is at a third location 216, which is within range of both the AP1.1-AP1.3 and the AP2.1-AP2.3, the MLD 210 may be active on one or two of the links with the AP2.1-AP2.3 while being active on two or one of the links with the AP1.1-AP1.3. As a result, before the MLD 210 is fully transitioned to the AP2.1-AP2.3 from the AP.1.1-AP1.3, the MLD 210 may have an active connection with both the AP1.1-AP1.3 and the AP2.1-AP2.23, allowing for a seamless connection without any packet loss during link switching.

In one or more embodiments, the controller 204 may represent a centralized multi-AP controller. Using the non-collocated MLD framework shown, in addition to a centralized BA agreement per MLD at the MAC service AP (SAP, e.g., the controller 240) level, the controller 204 may enable packet transmission and retransmission over any active available link in different physical locations, avoiding packet loss or delay that may be caused by forwarding packets (e.g., the frames 146 and the frames 148 of FIG. 1A) from a source AP MLD to a new AP MLD while the MLD 210 is moving. However, the reordering process may be challenging (e.g., the controller 204 may need to function like an upper MAC layer with the AP1.1-AP1.3 and the AP2.1-AP2.3 functioning like a lower MAC layer), and the PTK sharing among multiple links may have some vulnerabilities.

FIG. 2B illustrates a schematic diagram 250 of a non-collocated MLD, in accordance with one or more example embodiments of the present disclosure.

Referring to FIG. 2B, an A-MLD 252 may include an upper MAC layer 254 and AP1.1-AP1.3. An A-MLD 256 may include an upper MAC layer 258 and AP2.1-AP2.3. The A-MLD 252 and the A-MLD 256 may communicate (e.g., using a backhaul connection) with a controller 260 (e.g., a non-collocated multi-link controller). In this manner, rather than relying on the controller 260 as an upper MAC layer to perform packet reordering, the A-MLD 252 and the A-MLD 256 may have their own respective upper MAC layers. A MLD 270 (e.g., a non-AP MLD) may have multiple STAs (e.g., the non-AP STA 182, the non-AP STA 184, and the non-AP STA 186 of FIG. 1C), and may associated to AP1.1-AP1.3 at a first physical location 272. The MLD 270 may be associated to AP2.1-AP2.3 at a second physical location 274. When the MLD 270 is at the first physical location 272 (e.g., closer to the AP1.1-AP1.3), the MLD 270 may enable active transmissions with the AP1.1-AP1.3 while setting the connection with the AP2.1-AP2.3 to be in a sleep mode. When the MLD is at a third location 276, which is within range of both the AP1.1-AP1.3 and the AP2.1-AP2.3, the MLD 270 may be active on one or two of the links with the AP2.1-AP2.3 while being active on two or one of the links with the AP1.1-AP1.3. As a result, before the MLD 270 is fully transitioned to the AP2.1-AP2.3 from the AP.1.1-AP1.3, the MLD 270 may have an active connection with both the AP1.1-AP1.3 and the AP2.1-AP2.23, allowing for a seamless connection without any packet loss during link switching.

In one or more embodiments, rather than sharing a PTK with multiple links, each link to the MLD 270 may have its own PTK or other security key, either generated by the controller 260 and provided to the MLD 270 via the A-MLD 252 and the A-MLD 256 (e.g., and forwarded to the MLD 270), or generated respectively and independently by the A-MLD 252 and the A-MLD 256 (e.g., by the AP1.1-AP1.3 and by the AP2.1-AP2.3 respectively) and provided to the MLD 270. When the MLD 270 is not in range of one of the A-MLDs, that A-MLD may send packets (e.g., the frames 146 and the frames 148 of FIG. 1A) and security keys to the controller 260 to send to the other A-MLD, to send to the MLD 270 (e.g., the A-MLD that is in coverage with the MLD 270). In this manner, when the MLD 270 moves from one location to another and transitions from one multi-link set to another, the MLD 270 may use a different PTK or security key for the links to which the MLD 270 transitions rather than using the same PTK or security key that the MLD 270 was using with the previous links. The PTK or security key may be provided to the MLD 270 after being generated by the controller 260 or by the AP1.1-AP1.3 and the AP2.1-AP2.3.

In one or more embodiments, the BA agreement may be per non-collocated MLD, but reordering may be done among a collocated multi-link set. The BA agreement may remain at the MLD level (e.g., for all APs, collocated and non-collocated), but the expectation is that reordering may be done among collocated multi-links (e.g., the AP1.1-AP1.3, the AP2.1-AP2.3), and the MLD 270 may enable only links that are collocated. When transitioning, the MLD 270 may disable links to collocated multi-links from the AP1.1-AP1.3 and enable links to collocated multi-links AP2.1-AP2.3. When transitioning, the MLD 270 may enable links from both AP1.1-AP1.3 and AP2.1-AP2.3. To enable reordering in each of the collocated multi-links while keeping the BA agreement per non-collocated MLD, the SN range in each collocated multi-link group needs to be defined, and scoreboard sharing among two groups of multi-link sets may be also needed, especially during the transition phase. For example, during the transition phase, the controller 260 may distribute duplicate packets with sequence number from 1 to 63 to both multi-link set 1 (AP1.1-AP1.3) and multi-link set 2 (AP2.1-AP2.3), and tagged that packets with SN 1-31 may be transmitted by the controller 260 through multi-link set1, and packets with SN 32-63 may be transmitted through multi-link set 2. If the packet with SN 1-31 cannot be transmitted successfully through multi-link set1, the MLD 270 can trigger or request the multi-link set2 to transmit the packet and deactive the connection with multi-link set1.

In one or more embodiments, the BA agreement may be done per collocated multi-link set in a non-collocated MLD. This modification of the MLD concept can reduce the implementation complexity for a non-collocated MLD, the reordering can be processed in each collocated multi-link set as shown in FIG. 2B. The non-collocated MLD controller 260 can perform intelligent traffic splitting and steering to avoid packet loss or delay by forwarding data frames from source multi-link set to new multi-link set. This can be achieved in different ways: (1) Predicting transition: the controller 260 can switch the MLD 270 to a particular link based on mobility pattern, RSSI etc. The MLD 270 can inform the controller 260 before making a switch (e.g., 20 ms before a switch inform the controller 260 that the MLD 270 is going to enable/disable a link) so that the data delivery is not affected. (2) Redundancy distribution: the central controller 260 can distribute the data to both source multi-link set and target multi-link set while it can predict the coming link switch by leveraging 802.1cb layer protocol or by scheduling in the upper MAC.

In one or more embodiments, to avoid packet loss, the controller 260 may send packets (e.g., the frames 146 and the frames 148 of FIG. 1A) to both multi-link sets (e.g., AP1.1-AP1.3 and AP2.1-AP2.3) so that either multi-link set (e.g., whichever is in range of the MLD 270) may forward the packets to the MLD 270.

In one or more embodiments, based on the requests for retransmissions provided by the MLD 270, the A-MLD 252 and the A-MLD 256 may generate respective scoreboard indicating which packets (e.g., as indicated by the SNs) were received and not received by the MLD 270. The A-MLD 252 and the A-MLD 256 may provide their scoreboard to the controller 260 to provide to the other A-MLD (e.g., the scoreboard for the transmissions of the A-MLD 252 may be provided to the A-MLD 256, and the scoreboard for the transmissions of the A-MLD 256 may be provided to the A-MLD 252). This way, the controller 260 may identify which packets were not received by the MLD 270, and may retransmit those packets to one or both of the A-MLDs to forward to the MLD 270.

It is understood that the above descriptions are for purposes of illustration and are not meant to be limiting.

Figure 3A:
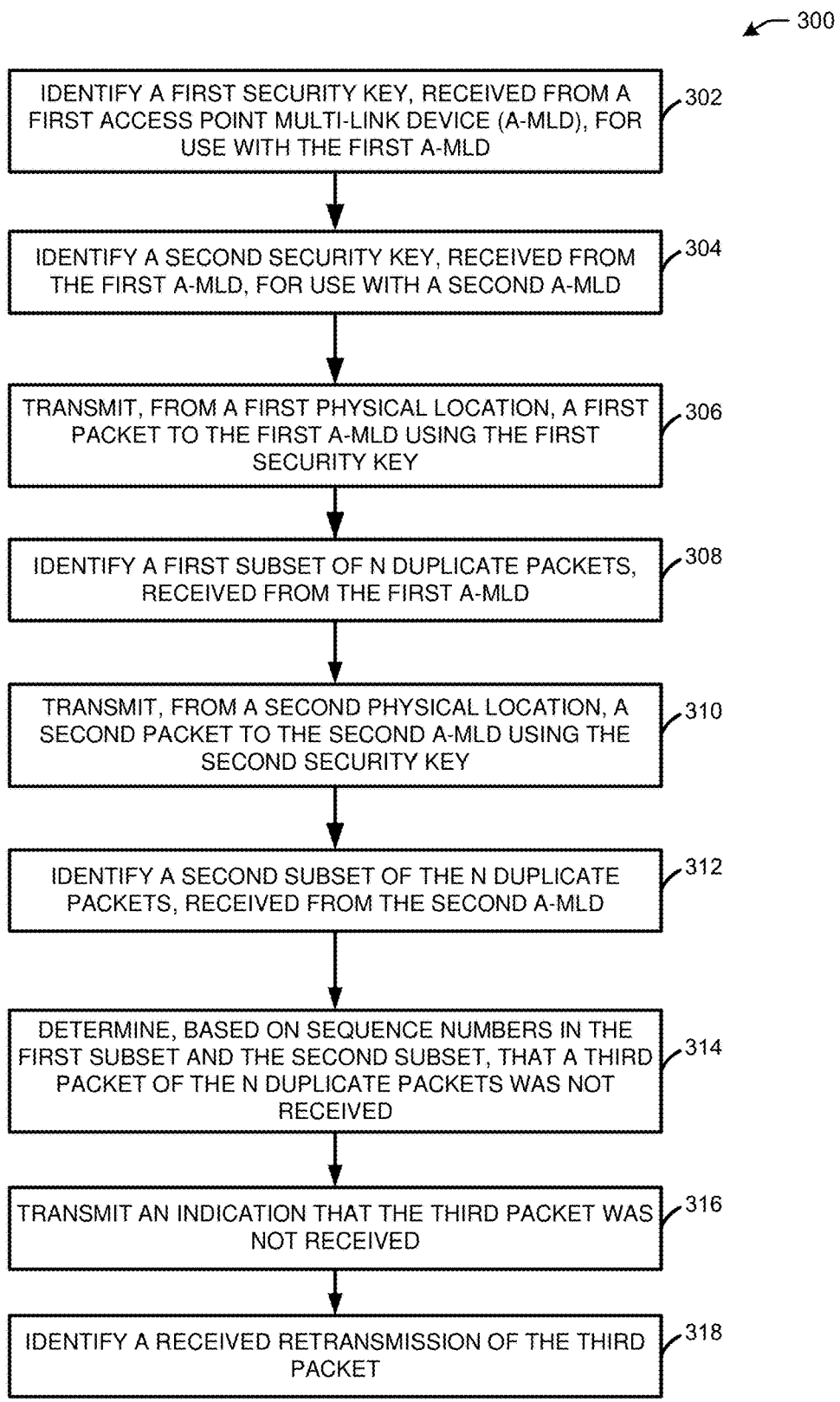
FIG. 3A illustrates a flow diagram of illustrative process for enhanced MLD handover, in accordance with one or more example embodiments of the present disclosure.

FIG. 3A illustrates a flow diagram of illustrative process 300 for enhanced MLD handover, in accordance with one or more example embodiments of the present disclosure.

At block 302, an MLD (e.g., one of the user devices 120 of FIG. 1A, the multi-link device 180 of FIG. 1C, the MLD 210 of FIG. 2A, the MLD 270 of FIG. 2B, the enhanced handover device 519 of FIG. 5) may identify a first security key received from a first A-MLD (e.g., one of the APs 102 of FIG. 1A, the MLD 172 of FIG. 1C, the AP1.1-AP1.3 of FIG. 2A, the A-MLD 252 of FIG. 2B). The first security key may be used to authenticate the MLD to the first A-MLD for communications with the first A-MLD.

At block 304, the MLD may identify a second security key received from a second A-MLD (e.g., one of the APs 102 of FIG. 1A, the MLD 172 of FIG. 1C, the AP2.1-AP2.3 of FIG. 2A, the A-MLD 256 of FIG. 2B). The second security key may be used to authenticate the MLD to the second A-MLD for communications with the second A-MLD. The first and second security keys may be generated by a controller (e.g., the controller 150 of FIG. 1A, the controller 204 of FIG. 2A, the controller 260 of FIG. 2B) or by the first A-MLD and the second A-MLD (e.g., the first security key may be generated by the first A-MLD, and the second security key may be generated by the second A-MLD). When the security keys are generated by the controller, the controller may provide the security keys to both the first and second A-MLDs to forward to the MLD, allowing the MLD to have access to both security keys even when one of the A-MLDs may be out of range (e.g., the first A-MLD may provide both security keys to the MLD while in range even when the MLD is out of range of the second A-MLD, allowing the MLD to use the second security key when in range of the second A-MLD).

At block 306, the MLD may transmit, from a first physical location, a first packet (e.g., the frames 146 or the frames 148 of FIG. 1A) to the first A-MLD, and the first packet may include the first security key.

At block 308, the MLD may identify a first subset of N duplicate packets received from the first A-MLD. The controller may generate the N duplicate packets having a same traffic identifier and different respective sequence numbers (e.g., 1-N), and may send the N duplicate packets to both the first A-MLD and the second A-MLD to be forwarded to the MLD.

At block 310, the MLD may transmit, from a second physical location, a second packet (e.g., the frames 146 or the frames 148 of FIG. 1A) to the second A-MLD, and the second packet may include the second security key. At block 312, the MLD may identify the second subset of the N duplicate packets. The second subset may be received from the second A-MLD based on instructions by the controller for each A-MLD to deliver a particular subset of the N duplicate packets to the MLD.

At block 314, the MLD may determine that one or more packets (e.g., a third packet) of the N duplicate packets were not received. Because of the same traffic identifier and the N sequence numbers, any missing sequence number may indicate to the MLD that the packet with that sequence number was not received.

At block 316, the MLD may transmit an indication that the third packet was not received. The indication may indicate a request for retransmission, and may be sent to the first and/or second A-MLD (e.g., based on which A-MLD sent the packet having that sequence number).

At block 318, the MLD may identify a received retransmission of the third packet in response to the indication (e.g., request) sent at block 316.

Figure 3B:
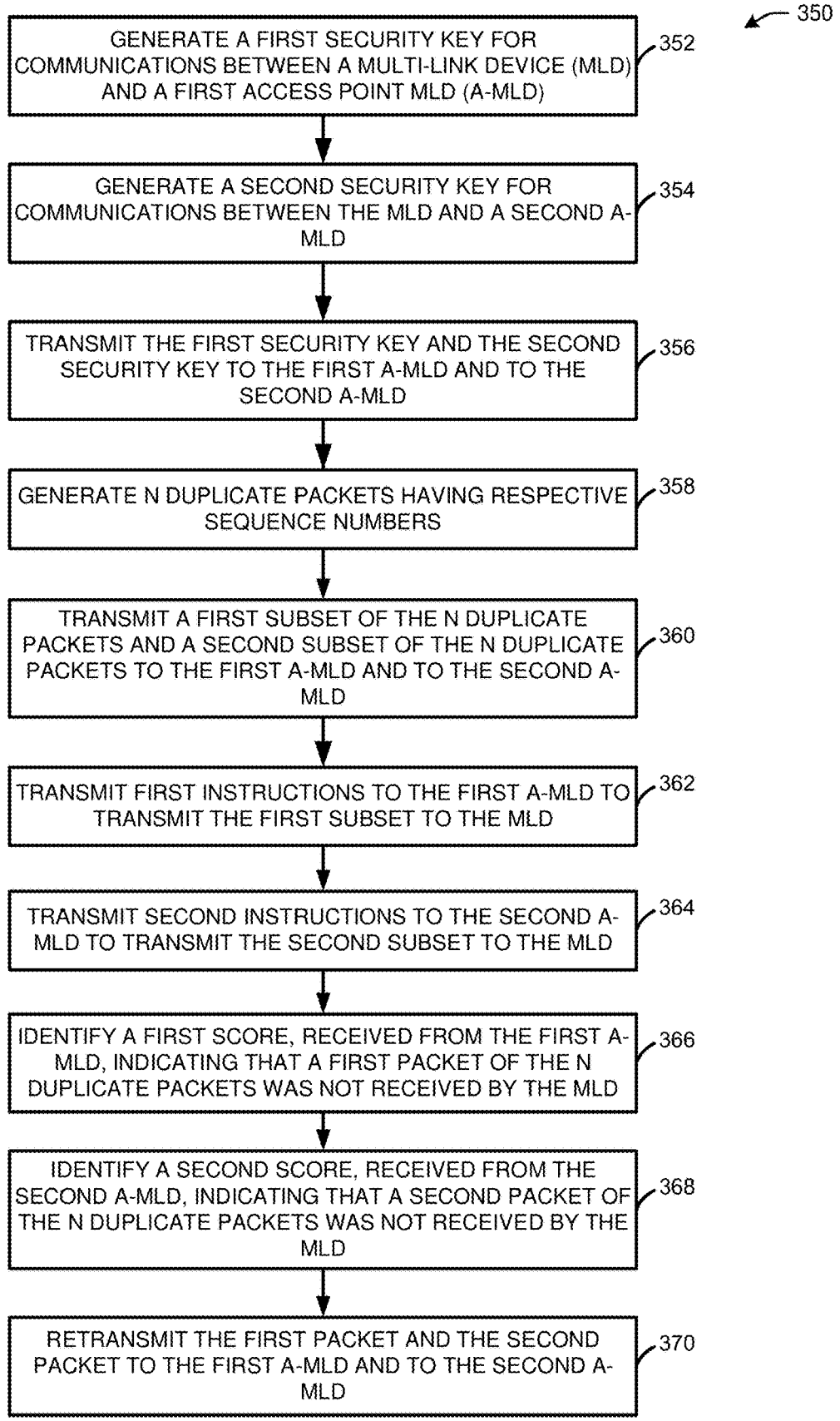
FIG. 3B illustrates a flow diagram of illustrative process for enhanced MLD handover, in accordance with one or more example embodiments of the present disclosure.

FIG. 3B illustrates a flow diagram of illustrative process 350 for enhanced MLD handover, in accordance with one or more example embodiments of the present disclosure.

At block 352, a controller device (e.g., the controller 150 of FIG. 1A, the controller 204 of FIG. 2A, the controller 260 of FIG. 2B) may generate a first security key for communications between a MLD (e.g., one of the APs 102 of FIG. 1A, the MLD 172 of FIG. 1C, the AP2.1-AP2.3 of FIG. 2A, the A-MLD 256 of FIG. 2B) and a first A-MLD (e.g., one of the APs 102 of FIG. 1A, the MLD 172 of FIG. 1C, the AP1.1-AP1.3 of FIG. 2A, the A-MLD 252 of FIG. 2B). The first security key may be used to authenticate the MLD to the first A-MLD for communications with the first A-MLD.

At block 354, the controller device may generate a second security key for communications between the MLD and a second A-MLD (e.g., one of the APs 102 of FIG. 1A, the MLD 172 of FIG. 1C, the AP2.1-AP2.3 of FIG. 2A, the A-MLD 256 of FIG. 2B). The second security key may be used to authenticate the MLD to the second A-MLD for communications with the second A-MLD.

At block 356, the controller device may transmit the first security key and the second security key to the first and second A-MLDs so that either A-MLD may provide both security keys to the MLD.

At block 358, the controller device may generate N duplicate packets with sequence numbers 1-N, respectively. At block 360, the controller device may transmit a first subset of the N duplicate packets and a second subset of the N duplicate packets to the first and second A-MLDs.

At block 362, the controller device may transmit first instructions to the first A-MLD to transmit the first subset of N duplicate packets to the MLD. At block 364, the controller device may transmit second instructions to the second A-MLD to transmit the second subset of N duplicate packets to the MLD.

At block 366, the controller device may identify a first score generated by and received from the first A-MLD. The first score (e.g., scoreboard sharing) may indicate which of the N duplicate packets were received and not received by the MLD. At block 368, the controller device may identify a second score generated by and received from the second A-MLD. The second score (e.g., scoreboard sharing) may indicate which of the N duplicate packets were received and not received by the MLD.

At block 370, the controller device may retransmit any of the N duplicate packets that were not received by the MLD, or may instruct the first and/or second A-MLD to retransmit any of the N duplicate packets that were not received by the MLD.

It is understood that the above descriptions are for purposes of illustration and are not meant to be limiting.

FIG. 4 shows a functional diagram of an exemplary communication station 400, in accordance with one or more example embodiments of the present disclosure. In one embodiment, FIG. 4 illustrates a functional block diagram of a communication station that may be suitable for use as an AP 102 (FIG. 1A) or a user device 120 (FIG. 1A) in accordance with some embodiments. The communication station 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 400 may include communications circuitry 402 and a transceiver 410 for transmitting and receiving signals to and from other communication stations using one or more antennas 401. The communications circuitry 402 may include circuitry that can operate the physical layer (PHY) communications and/or medium access control (MAC) communications for controlling access to the wireless medium, and/or any other communications layers for transmitting and receiving signals. The communication station 400 may also include processing circuitry 406 and memory 408 arranged to perform the operations described herein. In some embodiments, the communications circuitry 402 and the processing circuitry 406 may be configured to perform operations detailed in the above figures, diagrams, and flows.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication station 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements. The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station YY00 may include one or more processors and may be configured with instructions stored on a computer-readable storage device.

FIG. 5 illustrates a block diagram of an example of a machine 500 or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518 (e.g., a speaker), an enhanced handover device 519, a network interface device/transceiver 520 coupled to antenna(s) 530, and one or more sensors 528, such as a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 502 for generation and processing of the baseband signals and for controlling operations of the main memory 504, the storage device 516, and/or the enhanced handover device 519. The baseband processor may be provided on a single radio card, a single chip, or an integrated circuit (IC).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

The enhanced handover device 519 may carry out or perform any of the operations and processes (e.g., process 300, process 350) described and shown above.

It is understood that the above are only a subset of what the enhanced handover device 519 may be configured to perform and that other functions included throughout this disclosure may also be performed by the enhanced handover device 519.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 6:
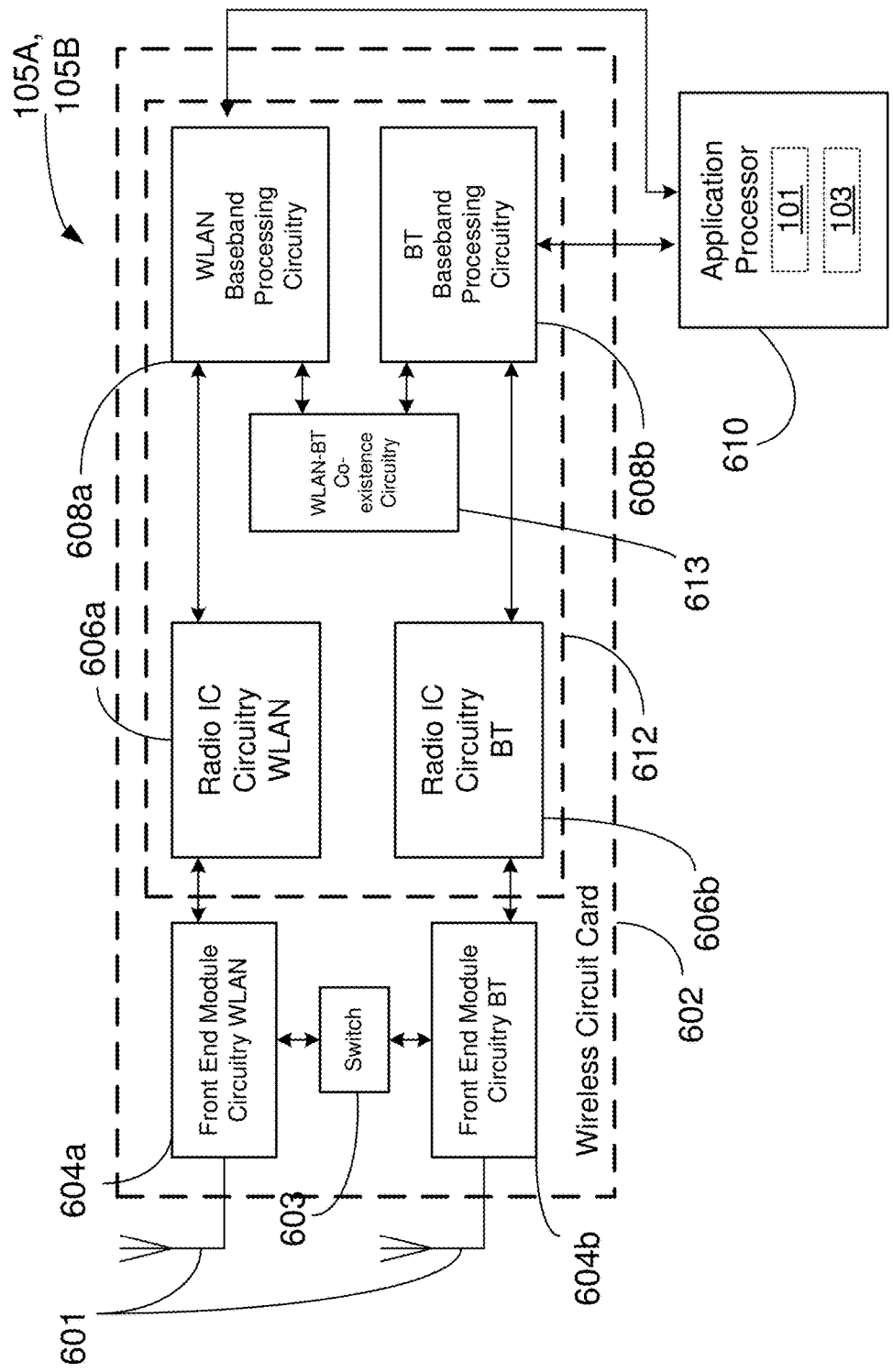
FIG. 6 is a block diagram of a radio architecture in accordance with some examples.

FIG. 6 is a block diagram of a radio architecture 105A, 105B in accordance with some embodiments that may be implemented in any one of the example AP 102 and/or the example STA 120 of FIG. 1A. Radio architecture 105A, 105B may include radio front-end module (FEM) circuitry XZX04*a-b*, radio IC circuitry XZX06*a-b* and baseband processing circuitry XZX08*a-b*. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 604*a-b* may include a WLAN or Wi-Fi FEM circuitry 604*a* and a Bluetooth (BT) FEM circuitry 604*b*. The WLAN FEM circuitry 604*a* may include a receive signal path comprising circuitry configured to operate on WLAN RF signals received from one or more antennas 601, to amplify the received signals and to provide the amplified versions of the received signals to the WLAN radio IC circuitry 606*a* for further processing. The BT FEM circuitry 604*b* may include a receive signal path which may include circuitry configured to operate on BT RF signals received from one or more antennas 601, to amplify the received signals and to provide the amplified versions of the received signals to the BT radio IC circuitry 606*b* for further processing. FEM circuitry 604*a* may also include a transmit signal path which may include circuitry configured to amplify WLAN signals provided by the radio IC circuitry 606*a* for wireless transmission by one or more of the antennas 601. In addition, FEM circuitry 604*b* may also include a transmit signal path which may include circuitry configured to amplify BT signals provided by the radio IC circuitry 606*b* for wireless transmission by the one or more antennas. In the embodiment of FIG. 6, although FEM 604*a* and FEM 604*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 606a-b as shown may include WLAN radio IC circuitry 606a and BT radio IC circuitry 606b. The WLAN radio IC circuitry 606a may include a receive signal path which may include circuitry to down-convert WLAN RF signals received from the FEM circuitry 604a and provide baseband signals to WLAN baseband processing circuitry 608a. BT radio IC circuitry 606b may in turn include a receive signal path which may include circuitry to down-convert BT RF signals received from the FEM circuitry 604b and provide baseband signals to BT baseband processing circuitry 608b. WLAN radio IC circuitry 606a may also include a transmit signal path which may include circuitry to up-convert WLAN baseband signals provided by the WLAN baseband processing circuitry 608a and provide WLAN RF output signals to the FEM circuitry 604a for subsequent wireless transmission by the one or more antennas 601. BT radio IC circuitry 606b may also include a transmit signal path which may include circuitry to up-convert BT baseband signals provided by the BT baseband processing circuitry 608b and provide BT RF output signals to the FEM circuitry 604b for subsequent wireless transmission by the one or more antennas 601. In the embodiment of FIG. 6, although radio IC circuitries 606a and 606b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 608a-b may include a WLAN baseband processing circuitry 608a and a BT baseband processing circuitry 608b. The WLAN baseband processing circuitry 608a may include a memory, such as, for example, a set of RAM arrays in a Fast Fourier Transform or Inverse Fast Fourier Transform block (not shown) of the WLAN baseband processing circuitry 608a. Each of the WLAN baseband circuitry 608a and the BT baseband circuitry 608b may further include one or more processors and control logic to process the signals received from the corresponding WLAN or BT receive signal path of the radio IC circuitry 606a-b, and to also generate corresponding WLAN or BT baseband signals for the transmit signal path of the radio IC circuitry 606a-b. Each of the baseband processing circuitries 608a and 608b may further include physical layer (PHY) and medium access control layer (MAC) circuitry, and may further interface with a device for generation and processing of the baseband signals and for controlling operations of the radio IC circuitry 606a-b.

Referring still to FIG. 6, according to the shown embodiment, WLAN-BT coexistence circuitry 613 may include logic providing an interface between the WLAN baseband circuitry 608a and the BT baseband circuitry 608b to enable use cases requiring WLAN and BT coexistence. In addition, a switch 603 may be provided between the WLAN FEM circuitry 604a and the BT FEM circuitry 604b to allow switching between the WLAN and BT radios according to application needs. In addition, although the antennas 601 are depicted as being respectively connected to the WLAN FEM circuitry 604a and the BT FEM circuitry 604b, embodiments include within their scope the sharing of one or more antennas as between the WLAN and BT FEMs, or the provision of more than one antenna connected to each of FEM 604a or 604b.

In some embodiments, the front-end module circuitry 604a-b, the radio IC circuitry 606a-b, and baseband processing circuitry 608a-b may be provided on a single radio card, such as wireless radio card 602. In some other embodiments, the one or more antennas 601, the FEM circuitry 604a-b and the radio IC circuitry 606a-b may be provided on a single radio card. In some other embodiments, the radio IC circuitry 606a-b and the baseband processing circuitry 608a-b may be provided on a single chip or integrated circuit (IC), such as IC 612.

In some embodiments, the wireless radio card 602 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay, 802.11be, and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 608b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 7:
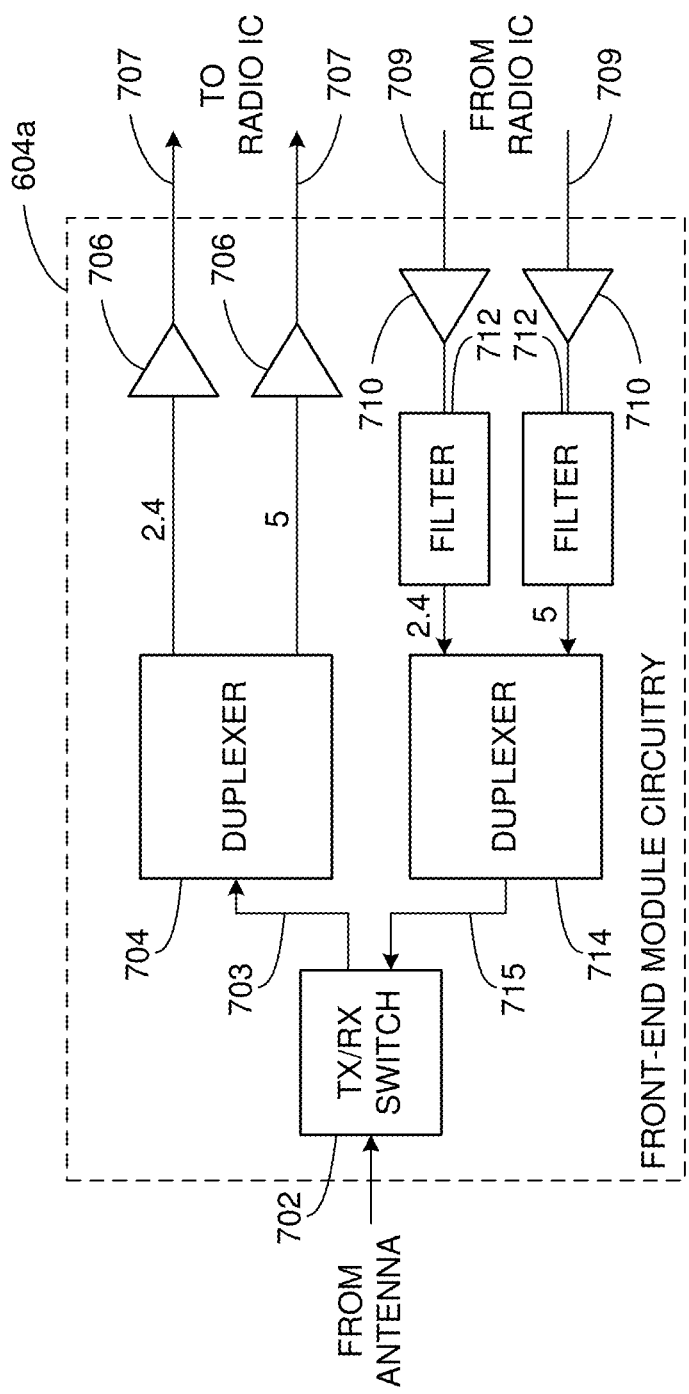
FIG. 7 illustrates an example front-end module circuitry for use in the radio architecture of FIG. 6, in accordance with one or more example embodiments of the present disclosure.

FIG. 7 illustrates WLAN FEM circuitry 604a in accordance with some embodiments. Although the example of FIG. 7 is described in conjunction with the WLAN FEM circuitry 604a, the example of FIG. 7 may be described in conjunction with the example BT FEM circuitry 604b (FIG. 6), although other circuitry configurations may also be suitable.

In some embodiments, the FEM circuitry 604a may include a TX/RX switch 702 to switch between transmit mode and receive mode operation. The FEM circuitry 604a may include a receive signal path and a transmit signal path. The receive signal path of the FEM circuitry 604a may include a low-noise amplifier (LNA) 706 to amplify received RF signals 703 and provide the amplified received RF signals 707 as an output (e.g., to the radio IC circuitry 606a-b (FIG. 6)). The transmit signal path of the circuitry 604a may include a power amplifier (PA) to amplify input RF signals 709 (e.g., provided by the radio IC circuitry 606a-b), and one or more filters 712, such as band-pass filters (BPFs), low-pass filters (LPFs) or other types of filters, to generate RF signals 715 for subsequent transmission (e.g., by one or more of the antennas 601 (FIG. 6)) via an example duplexer 714.

In some dual-mode embodiments for Wi-Fi communication, the FEM circuitry 604a may be configured to operate in either the 2.4 GHz frequency spectrum or the 5 GHz frequency spectrum. In these embodiments, the receive signal path of the FEM circuitry 604a may include a receive signal path duplexer 704 to separate the signals from each spectrum as well as provide a separate LNA 706 for each spectrum as shown. In these embodiments, the transmit signal path of the FEM circuitry 604a may also include a power amplifier 710 and a filter 712, such as a BPF, an LPF or another type of filter for each frequency spectrum and a transmit signal path duplexer 704 to provide the signals of one of the different spectrums onto a single transmit path for subsequent transmission by the one or more of the antennas 601 (FIG. 6). In some embodiments, BT communications may utilize the 2.4 GHz signal paths and may utilize the same FEM circuitry 604a as the one used for WLAN communications.

Figure 8:
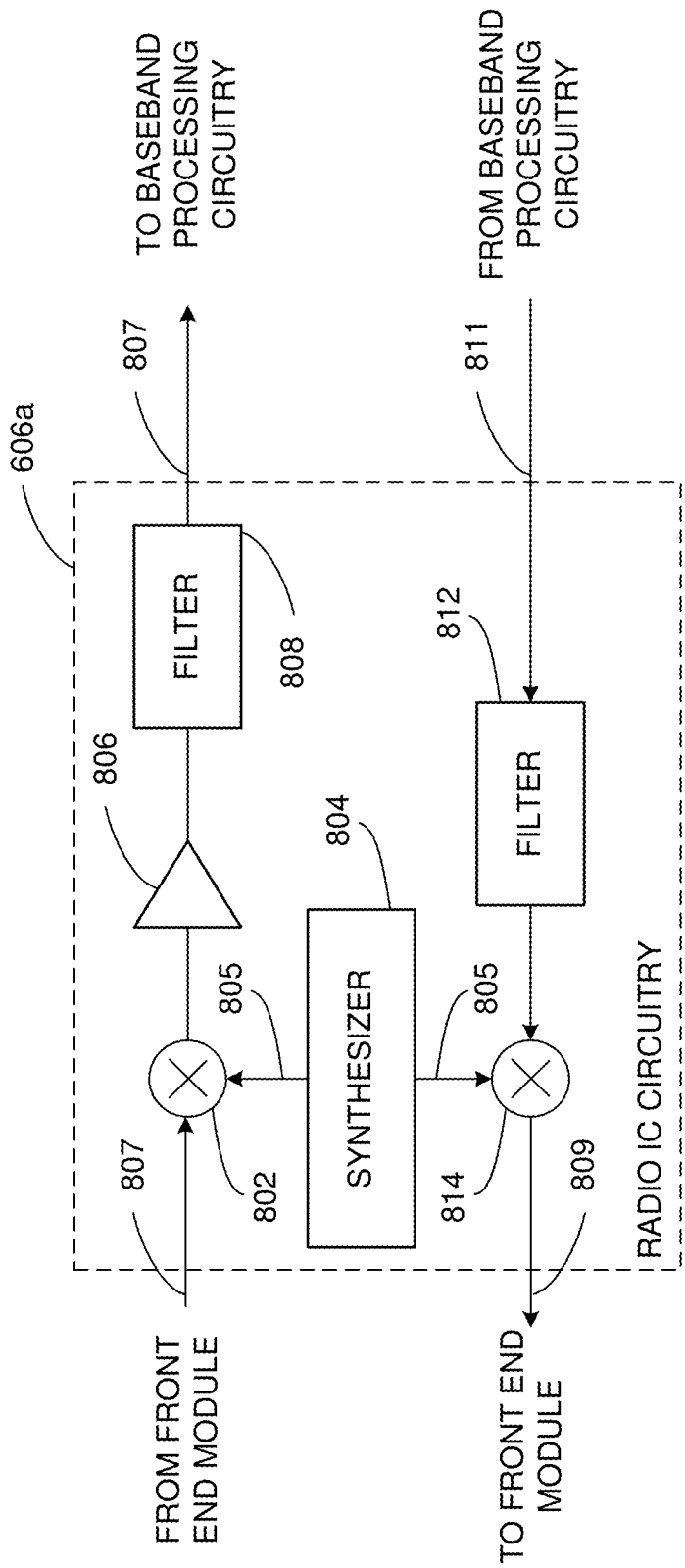
FIG. 8 illustrates an example radio IC circuitry for use in the radio architecture of FIG. 6, in accordance with one or more example embodiments of the present disclosure.

FIG. 8 illustrates radio IC circuitry 606a in accordance with some embodiments. The radio IC circuitry 606a is one example of circuitry that may be suitable for use as the WLAN or BT radio IC circuitry 606a/606b (FIG. 6), although other circuitry configurations may also be suitable. Alternatively, the example of FIG. 8 may be described in conjunction with the example BT radio IC circuitry 606b.

In some embodiments, the radio IC circuitry 606a may include a receive signal path and a transmit signal path. The receive signal path of the radio IC circuitry 606a may include at least mixer circuitry 802, such as, for example, down-conversion mixer circuitry, amplifier circuitry 806 and filter circuitry 808. The transmit signal path of the radio IC circuitry 606a may include at least filter circuitry 812 and mixer circuitry 814, such as, for example, up-conversion mixer circuitry. Radio IC circuitry 606a may also include synthesizer circuitry 804 for synthesizing a frequency 805 for use by the mixer circuitry 802 and the mixer circuitry 814. The mixer circuitry 802 and/or 814 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 8 illustrates only a simplified version of a radio IC circuitry, and may include, although not shown, embodiments where each of the depicted circuitries may include more than one component. For instance, mixer circuitry 814 may each include one or more mixers, and filter circuitries 808 and/or 812 may each include one or more filters, such as one or more BPFs and/or LPFs according to application needs. For example, when mixer circuitries are of the direct-conversion type, they may each include two or more mixers.

In some embodiments, mixer circuitry 802 may be configured to down-convert RF signals 707 received from the FEM circuitry 604a-b (FIG. 6) based on the synthesized frequency 805 provided by synthesizer circuitry 804. The amplifier circuitry 806 may be configured to amplify the down-converted signals and the filter circuitry 808 may include an LPF configured to remove unwanted signals from the down-converted signals to generate output baseband signals 807. Output baseband signals 807 may be provided to the baseband processing circuitry 608a-b (FIG. 6) for further processing. In some embodiments, the output baseband signals 807 may be zero-frequency baseband signals, although this is not a requirement. In some embodiments, mixer circuitry 802 may comprise passive mixers, although the scope of the embodiments is not limited in this respect.

In some embodiments, the mixer circuitry 814 may be configured to up-convert input baseband signals 811 based on the synthesized frequency 805 provided by the synthesizer circuitry 804 to generate RF output signals 709 for the FEM circuitry 604a-b. The baseband signals 811 may be provided by the baseband processing circuitry 608a-b and may be filtered by filter circuitry 812. The filter circuitry 812 may include an LPF or a BPF, although the scope of the embodiments is not limited in this respect.

In some embodiments, the mixer circuitry 802 and the mixer circuitry 814 may each include two or more mixers and may be arranged for quadrature down-conversion and/or up-conversion respectively with the help of synthesizer 804. In some embodiments, the mixer circuitry 802 and the mixer circuitry 814 may each include two or more mixers each configured for image rejection (e.g., Hartley image rejection). In some embodiments, the mixer circuitry 802 and the mixer circuitry 814 may be arranged for direct down-conversion and/or direct up-conversion, respectively. In some embodiments, the mixer circuitry 802 and the mixer circuitry 814 may be configured for super-heterodyne operation, although this is not a requirement.

Mixer circuitry 802 may comprise, according to one embodiment: quadrature passive mixers (e.g., for the in-phase (I) and quadrature phase (Q) paths). In such an embodiment, RF input signal 707 from FIG. 8 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 805 of synthesizer 804 (FIG. 8). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 707 (FIG. 7) may comprise a balanced signal, although the scope of the embodiments is not limited in this respect. The I and Q baseband output signals may be provided to low-noise amplifier, such as amplifier circuitry 806 (FIG. 8) or to filter circuitry 808 (FIG. 8).

In some embodiments, the output baseband signals 807 and the input baseband signals 811 may be analog baseband signals, although the scope of the embodiments is not limited in this respect. In some alternate embodiments, the output baseband signals 807 and the input baseband signals 811 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 804 may be a fractional-N synthesizer or a fractional N/N+1 synthesizer, although the scope of the embodiments is not limited in this respect as other types of frequency synthesizers may be suitable. For example, synthesizer circuitry 804 may be a delta-sigma synthesizer, a frequency multiplier, or a synthesizer comprising a phase-locked loop with a frequency divider. According to some embodiments, the synthesizer circuitry 804 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 804 may be provided by a voltage controlled oscillator (VCO), although that is not a requirement. A divider control input may further be provided by either the baseband processing circuitry 608a-b (FIG. 6) depending on the desired output frequency 805. In some embodiments, a divider control input (e.g., N) may be determined from a look-up table (e.g., within a Wi-Fi card) based on a channel number and a channel center frequency as determined or indicated by the example application processor 610. The application processor 610 may include, or otherwise be connected to, one of the example secure signal converter 101 or the example received signal converter 103 (e.g., depending on which device the example radio architecture is implemented in).

In some embodiments, synthesizer circuitry 804 may be configured to generate a carrier frequency as the output frequency 805, while in other embodiments, the output frequency 805 may be a fraction of the carrier frequency (e.g., one-half the carrier frequency, one-third the carrier frequency). In some embodiments, the output frequency 805 may be a LO frequency (fLO).

Figure 9:
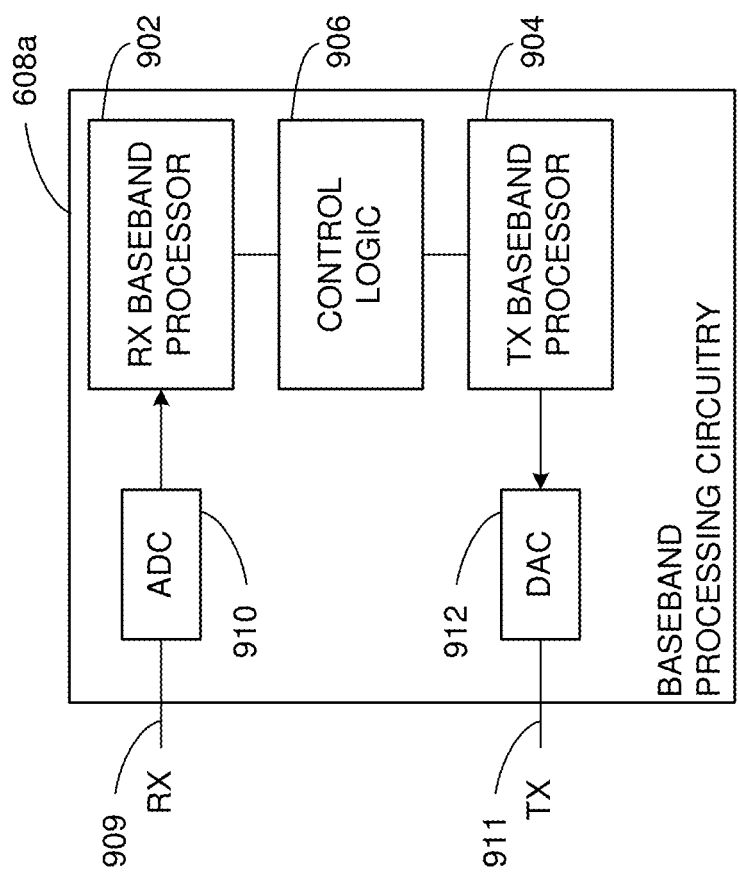
FIG. 9 illustrates an example baseband processing circuitry for use in the radio architecture of FIG. 6, in accordance with one or more example embodiments of the present disclosure.

FIG. 9 illustrates a functional block diagram of baseband processing circuitry 608a in accordance with some embodiments. The baseband processing circuitry 608a is one example of circuitry that may be suitable for use as the baseband processing circuitry 608a (FIG. 6), although other circuitry configurations may also be suitable. Alternatively, the example of FIG. 8 may be used to implement the example BT baseband processing circuitry 608b of FIG. 6.

The baseband processing circuitry 608a may include a receive baseband processor (RX BBP) 902 for processing receive baseband signals 809 provided by the radio IC circuitry 606ab (FIG. 6) and a transmit baseband processor (TX BBP) 904 for generating transmit baseband signals 811 for the radio IC circuitry 606a-b. The baseband processing circuitry 608a may also include control logic 906 for coordinating the operations of the baseband processing circuitry 608a.

In some embodiments (e.g., when analog baseband signals are exchanged between the baseband processing circuitry 608a-b and the radio IC circuitry 606a-b), the baseband processing circuitry 608a may include ADC 910 to convert analog baseband signals 909 received from the radio IC circuitry XZX06a-b to digital baseband signals for processing by the RX BBP ZZZ02. In these embodiments, the baseband processing circuitry 608a may also include DAC 912 to convert digital baseband signals from the TX BBP 904 to analog baseband signals 911.

In some embodiments that communicate OFDM signals or OFDMA signals, such as through baseband processor 608a, the transmit baseband processor 904 may be configured to generate OFDM or OFDMA signals as appropriate for transmission by performing an inverse fast Fourier transform (IFFT). The receive baseband processor 902 may be configured to process received OFDM signals or OFDMA signals by performing an FFT. In some embodiments, the receive baseband processor 902 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 6, in some embodiments, the antennas 601 (FIG. 6) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 601 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may be an apparatus of a multi-link device (MLD), the apparatus comprising processing circuitry coupled to storage, the processing circuitry configured to: identify a first security key received from a first access point MLD (A-MLD), the first security key associated with communicating with the first A-MLD; identify a second security key received from the first A-MLD, the second security key associated with communicating with a second A-MLD; transmit, from a first physical location, a first packet to the first A-MLD, the first packet comprising the first security key; identify a first subset of N packets, the first subset received from the first A-MLD; transmit, from a second physical location, a second packet to the second A-MLD, the second packet comprising the second security key; identify a second subset of the N packets, the second subset received from the second A-MLD; determine, based on sequence numbers included in the first subset and the second subset, that a third packet of the N packets was not received; and transmit, to the first A-MLD or the second A-MLD, an indication that the third packet was not received.

Example 2 may include the apparatus of example 1 and/or some other example herein, wherein the third packet is sent to the MLD by the first A-MLD, and wherein the processing circuitry is further configured to identify the third packet received from the second A-MLD based on the indication that the third packet was not received.

Example 3 may include the apparatus of example 1 and/or some other example herein, wherein the N packets are distributed to both the first A-MLD and the second A-MLD and are generated by a controller associated with the first A-MLD and the second A-MLD.

Example 4 may include the apparatus of example 1 and/or some other example herein, wherein the first security key and the second security key are generated by a controller associated with the first A-MLD and the second A-MLD.

Example 5 may include the apparatus of example 1 and/or some other example herein, wherein the first security key is generated by the first A-MLD, and wherein the second security key is generated by the second A-MLD.

Example 6 may include the apparatus of example 1 and/or some other example herein, wherein the processing circuitry is further configured to: disable, at the second location, use of the first security key.

Example 7 may include the apparatus of example 1 and/or some other example herein, wherein the first security key is further associated with communicating with a first set of collocated APs of the first A-MLD, and wherein the second security key is further associated with communicating with a second set of collocated APs of the second A-MLD.

Example 8 may include the apparatus of example 1 and/or some other example herein, wherein, at the second location, a first communication link with the first A-MLD is active and a second communication link with the second A-MLD is active.

Example 9 may include the apparatus of example 1 and/or some other example herein, wherein the processing circuitry is further configured to transmit, prior to the MLD being at the second location, an indication to the first A-MLD that the MLD will switch from a first communication link with the first A-MLD to a second communication link with the second A-MLD when at the second location.

Example 10 may include the device of example 1 and/or some other example herein, further comprising a transceiver configured to transmit and receive wireless signals comprising the first security key, the second security key, the first subset, and the second subset.

Example 11 may include the device of example 10 and/or some other example herein, further comprising one or more antennas coupled to the transceiver.

Example 12 may include a computer-readable storage medium comprising instructions to cause processing circuitry of a controller device of a first access point (AP) multi-link device (A-MLD) and a second A-MLD, upon execution of the instructions by the processing circuitry, to: generate a first security key for communications between a MLD the first A-MLD; generate a second security key for communications between the MLD the second A-MLD; transmit the first security key and the second security key to the first A-MLD or the second A-MLD to forward to the MLD; generate N packets having respective sequence numbers; transmit the N packets to both the first A-MLD and the second A-MLD; transmit first instructions to the first A-MLD to transmit a first subset of the N packets to the MLD; transmit second instructions to the second A-MLD to transmit a second subset of the N packets to the MLD; identify a first score received from the first A-MLD, the first score indicates that a first packet of the N packets was not received by the MLD; and identify a second score received from the second A-MLD, the second score indicates that a second packet of the N packets was not received by the MLD.

Example 13 may include the computer-readable medium of example 12 and/or some other example herein, wherein the first security key is further associated with communicating with a first set of collocated APs of the first A-MLD, and wherein the second security key is further associated with communicating with a second set of collocated APs of the second A-MLD.

Example 14 may include the computer-readable medium of example 12 and/or some other example herein, wherein execution of the instructions further causes the processing circuitry to: identify an indication received from the first A-MLD indicating that the MLD will switch from a first communication link with the first A-MLD to a second communication link with the second A-MLD, wherein to transmit a first packet of the second subset is based on the indication.

Example 15 may include the computer-readable medium of example 12 and/or some other example herein, wherein execution of the instructions further causes the processing circuitry to: generate a prediction that the MLD will switch from a first communication link with the first A-MLD to a second communication link with the second A-MLD, wherein to transmit a first packet of the second subset is based on the prediction.

Example 16 may include a method for performing multi-link device (MLD) operations, the method comprising: transmitting, by a first access point (AP) MLD (A-MLD) a first security key and a second security key to a MLD, the first security key associated with communicating with the first A-MLD, and the second security key associated with communicating with a second A-MLD; identifying a first packet received from the MLD, the first packet comprising the first security key; identifying N packets received from a controller associated with the first A-MLD and the second A-MLD, the N packets comprising respective sequence numbers; transmitting a first subset of N packets to the MLD; refraining from transmitting a second subset of the N packets to the MLD; identifying an indication received from the MLD that a second packet of the N packets was not received by the MLD; and retransmitting, to the MLD, the second packet.

Example 17 may include the method of example 16 and/or some other example herein, further comprising generating the first security key.

Example 18 may include the method of example 16 and/or some other example herein, further comprising identifying the first security key and the second security key both received from the controller.

Example 19 may include the method of example 16 and/or some other example herein, further comprising: transmitting, to the controller, a score indicating that the second packet was note received by the MLD.

Example 20 may include the method of example 16 and/or some other example herein, further comprising: identifying an indication received from the MLD indicating that the MLD will switch from a first communication link with the first A-MLD to a second communication link with the second A-MLD.

Example 21 may include an apparatus comprising means for: transmitting, by a first access point (AP) MLD (A-MLD) a first security key and a second security key to a MLD, the first security key associated with communicating with the first A-MLD, and the second security key associated with communicating with a second A-MLD; identifying a first packet received from the MLD, the first packet comprising the first security key; identifying N packets received from a controller associated with the first A-MLD and the second A-MLD, the N packets comprising respective sequence numbers; transmitting a first subset of N packets to the MLD; refraining from transmitting a second subset of the N packets to the MLD; identifying an indication received from the MLD that a second packet of the N packets was not received by the MLD; and retransmitting, to the MLD, the second packet.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An apparatus of a multi-link device (MLD), the apparatus comprising processing circuitry coupled to storage, the processing circuitry configured to:
identify a first security key received from a first access point MLD (A-MLD), the first security key associated with communicating with the first A-MLD;
identify a second security key received from the first A-MLD, the second security key associated with communicating with a second A-MLD;
transmit, from a first physical location, a first packet to the first A-MLD, the first packet comprising the first security key;
identify a first subset of N packets, the first subset received from the first A-MLD;
transmit, from a second physical location, a second packet to the second A-MLD, the second packet comprising the second security key;
identify a second subset of the N packets, the second subset received from the second A-MLD;
determine, based on sequence numbers included in the first subset and the second subset, that a third packet of the N packets was not received; and
transmit, to the first A-MLD or the second A-MLD, an indication that the third packet was not received.

2. The apparatus of claim 1, wherein the third packet is sent to the MLD by the first A-MLD, and wherein the processing circuitry is further configured to identify the third packet received from the second A-MLD based on the indication that the third packet was not received.

3. The apparatus of claim 1, wherein the N packets are distributed to both the first A-MLD and the second A-MLD and are generated by a controller associated with the first A-MLD and the second A-MLD.

4. The apparatus of claim 1, wherein the first security key and the second security key are generated by a controller associated with the first A-MLD and the second A-MLD.

5. The apparatus of claim 1, wherein the first security key is generated by the first A-MLD, and wherein the second security key is generated by the second A-MLD.

6. The apparatus of claim 1, wherein the processing circuitry is further configured to:
disable, at the second location, use of the first security key.

7. The apparatus of claim 1, wherein the first security key is further associated with communicating with a first set of collocated APs of the first A-MLD, and wherein the second security key is further associated with communicating with a second set of collocated APs of the second A-MLD.

8. The apparatus of claim 1, wherein, at the second location, a first communication link with the first A-MLD is active and a second communication link with the second A-MLD is active.

9. The apparatus of claim 1, wherein the processing circuitry is further configured to transmit, prior to the MLD being at the second location, an indication to the first A-MLD that the MLD will switch from a first communication link with the first A-MLD to a second communication link with the second A-MLD when at the second location.

10. The apparatus of claim 1, further comprising a transceiver configured to transmit and receive wireless signals comprising the first security key, the second security key, the first subset, and the second subset.

11. The apparatus of claim 10, further comprising an antenna coupled to the transceiver.

12. A non-transitory computer-readable storage medium comprising instructions to cause processing circuitry of a controller device of a first access point (AP) multi-link device (A-MLD) and a second A-MLD, upon execution of the instructions by the processing circuitry, to:
generate a first security key for communications between a MLD the first A-MLD;
generate a second security key for communications between the MLD the second A-MLD;
transmit the first security key and the second security key to the first A-MLD or the second A-MLD to forward to the MLD;
generate N packets having respective sequence numbers;
transmit the N packets to both the first A-MLD and the second A-MLD;
transmit first instructions to the first A-MLD to transmit a first subset of the N packets to the MLD;
transmit second instructions to the second A-MLD to transmit a second subset of the N packets to the MLD;
identify a first score received from the first A-MLD, the first score indicates that a first packet of the N packets was not received by the MLD; and
identify a second score received from the second A-MLD, the second score indicates that a second packet of the N packets was not received by the MLD.

13. The non-transitory computer-readable storage medium of claim 12, wherein the first security key is further associated with communicating with a first set of collocated APs of the first A-MLD, and wherein the second security key is further associated with communicating with a second set of collocated APs of the second A-MLD.

14. The non-transitory computer-readable storage medium of claim 12, wherein execution of the instructions further causes the processing circuitry to:
identify an indication received from the first A-MLD indicating that the MLD will switch from a first communication link with the first A-MLD to a second communication link with the second A-MLD,
wherein to transmit a first packet of the second subset is based on the indication.

15. The non-transitory computer-readable storage medium of claim 12, wherein execution of the instructions further causes the processing circuitry to:
generate a prediction that the MLD will switch from a first communication link with the first A-MLD to a second communication link with the second A-MLD,
wherein to transmit a first packet of the second subset is based on the prediction.

16. A method for performing multi-link device (MLD) operations, the method comprising:
transmitting, by a first access point (AP) MLD (A-MLD) a security key to a MLD, the security key associated with communicating with the first A-MLD;
identifying a first packet received from the MLD, the first packet comprising the security key;
identifying N packets received from a controller associated with the first A-MLD and a second A-MLD, the N packets comprising respective sequence numbers;
transmitting a first subset of N packets to the MLD;
identifying an indication received from the MLD that a second packet of the N packets was not received by the MLD; and
retransmitting, to the MLD, the second packet.

17. The method of claim 16, further comprising generating the first security key.

18. The method of claim 16, further comprising identifying the security key received from the controller.

19. The method of claim 16, further comprising:
transmitting, to the controller, a score indicating that the second packet was not received by the MLD.

20. The method of claim 16, further comprising:
identifying an indication received from the MLD indicating that the MLD will switch from a first communication link with the first A-MLD to a second communication link with the second A-MLD.

\* \* \* \* \*